(12) United States Patent
Cox

(10) Patent No.: US 11,863,347 B2
(45) Date of Patent: Jan. 2, 2024

(54) SYSTEMS AND METHODS FOR INTER-DEVICE NETWORKING USING INTRA-DEVICE PROTCOLS

(71) Applicant: Avago Technologies International Sales Pte. Limited, Singapore (SG)

(72) Inventor: Ian Cox, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 42 days.

(21) Appl. No.: 17/350,375

(22) Filed: Jun. 17, 2021

(65) Prior Publication Data

US 2022/0407740 A1 Dec. 22, 2022

(51) Int. Cl.
*H04L 12/46* (2006.01)
*H04L 45/745* (2022.01)

(52) U.S. Cl.
CPC ........ *H04L 12/4633* (2013.01); *H04L 45/745* (2013.01)

(58) Field of Classification Search
CPC .......................... H04L 12/4633; H04L 45/745
See application file for complete search history.

(56) References Cited

U.S. PATENT DOCUMENTS

| | | | |
|---|---|---|---|
| 7,734,859 B2 | 6/2010 | Daniel et al. | |
| 2005/0125575 A1* | 6/2005 | Alappat | H04L 61/5092 719/321 |
| 2005/0249160 A1* | 11/2005 | Tomita | H04L 47/10 370/252 |
| 2006/0126612 A1* | 6/2006 | Sandy | H04L 69/16 370/466 |
| 2010/0281195 A1* | 11/2010 | Daniel | G06F 9/45558 710/314 |
| 2014/0237156 A1* | 8/2014 | Regula | G06F 13/4027 710/314 |
| 2016/0057050 A1* | 2/2016 | Ostrom | H04L 45/00 370/392 |
| 2018/0220283 A1* | 8/2018 | Condeixa | H04L 67/12 |
| 2020/0322287 A1* | 10/2020 | Connor | H04L 49/356 |
| 2021/0311643 A1* | 10/2021 | Shanbhogue | G06F 3/0679 |
| 2022/0137864 A1* | 5/2022 | Lee | G06F 15/7821 711/154 |

* cited by examiner

*Primary Examiner* — Oleg Survillo
*Assistant Examiner* — Monishwar Mohan
(74) *Attorney, Agent, or Firm* — Foley & Lardner LLP

(57) ABSTRACT

In some aspects, the disclosure is directed to methods and systems for encapsulating intra-device protocols, such as CXL and/or PCIe packets, into inter-device protocols, such as IP packets, allowing resources across one or more networks to be shared. For example, CXL and/or PCIe address to IP address lookup tables may be used to determine destination IP addresses or source IP addresses such that CXL and/or PCIe packets may be sent across various networks. Layer 3 forwarding enables communication between large distributed systems while utilizing existing network infrastructure.

13 Claims, 11 Drawing Sheets

SYSTEMS AND METHODS FOR INTER-DEVICE NETWORKING USING INTRA-DEVICE PROTCOLS

FIELD OF THE DISCLOSURE

This disclosure generally relates to networking and communications, including but not limited to using intra-device protocols such as Compute Express Link (CXL) standards and Peripheral Component Interconnect Express (PCIe) standards across an inter-device network.

BACKGROUND OF THE DISCLOSURE

Communications protocols may be roughly described as intra-device or inter-device, with high-speed intra-device protocols being used between internal device components such as processors, memory, and input/output devices, such as the CXL and PCIe protocols; and inter-device protocols used for communication between devices, such as the Internet Protocol (IP) and Transport Control Protocol (TCP). As an intra-device protocol, CXL is a standard designed to facilitate high-speed and efficient communication between high-speed components using interfaces such as the PCIe interface. For example, the CXL protocol may be used with PCIe to provide low latency paths between host processors (e.g., central processing unit (CPU)) and devices that share memory resources (e.g., like accelerators and memory expanders). Employing CXL in tandem with PCIe switching increases the number of lanes in a bus available for communication. However, CXL and PCIe are limited to being within the reach of a single link of a CXL or PCIe switch.

BRIEF DESCRIPTION OF THE DRAWINGS

Various objects, aspects, features, and advantages of the disclosure will become more apparent and better understood by referring to the detailed description taken in conjunction with the accompanying drawings, in which reference numbers identify various objects, aspects, and features. In the drawings, like reference numbers (or similar reference numbers, duplicated reference numbers, etc.) generally indicate identical, functionally similar, and/or structurally similar elements.

The details of various embodiments of the methods and systems are set forth in the accompanying drawings and the description below.

DETAILED DESCRIPTION

For purposes of reading the description of the various embodiments below, the following descriptions of the sections of the specification and their respective contents can be helpful:

Section A describes a network environment and computing environment which can be useful for practicing embodiments described herein; and Section B describes embodiments of systems and methods for inter-device networking using intra-device protocols, according to one or more embodiments of the solution.

A. Computing and Network Environment

Figure 1A:
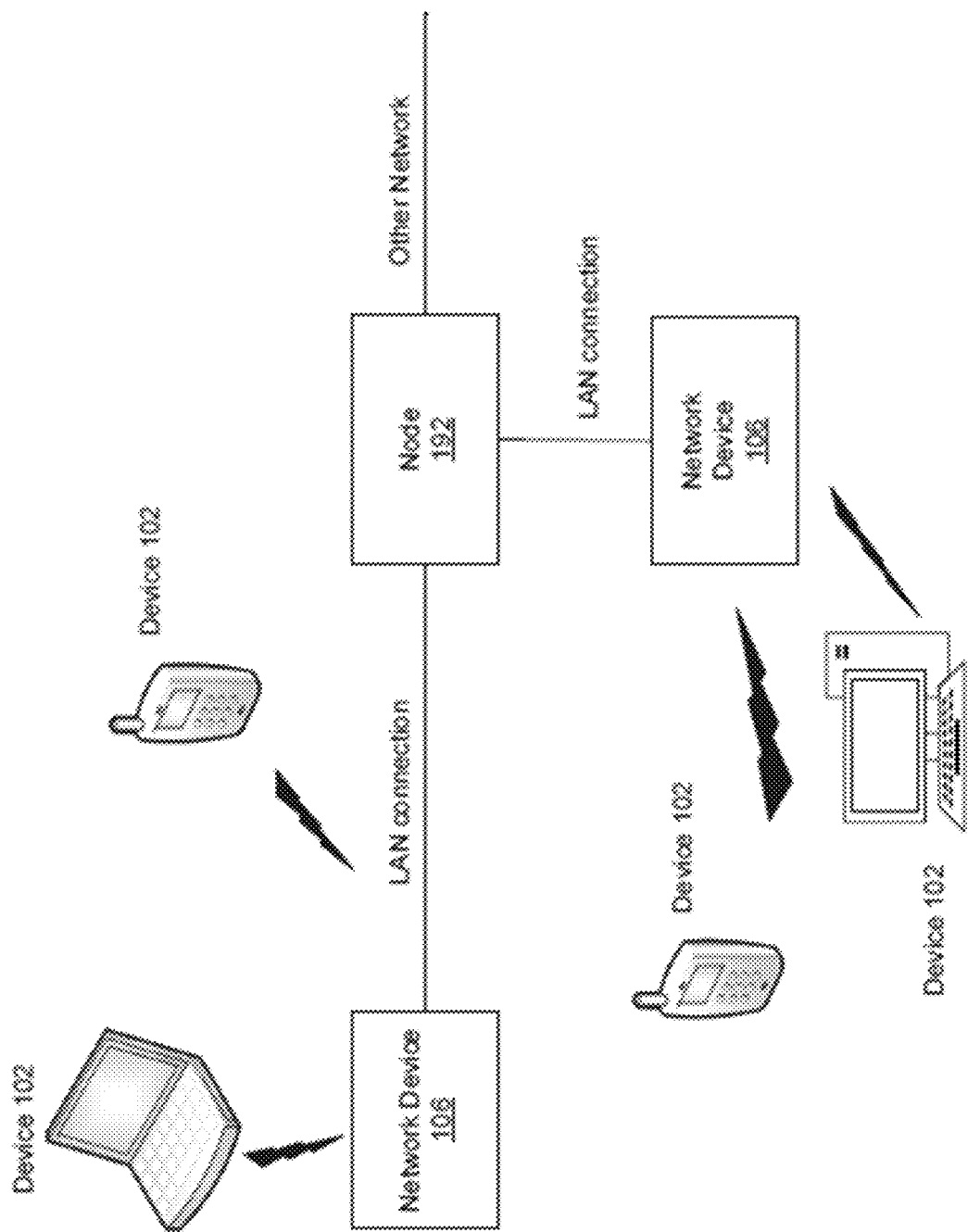
FIG. 1A is a block diagram depicting a network environment including one or more access points in communication with one or more devices or stations, in accordance with one or more embodiments of the solution.

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) 106, one or more wireless communication devices 102 and a network hardware component 192. The wireless communication devices 102 can for example include laptop computers 102, tablets 102, personal computers 102, Internet of Things (IoT) devices 102, and/or cellular telephone devices 102. The details of an embodiment of each wireless communication device 102 and/or AP 106 are described in greater detail with reference to FIGS. 1B and 1C. The network environment can be an ad hoc network environment, an infrastructure wireless network environment, a subnet environment, etc. in one embodiment. The APs 106 can be operably coupled to the network hardware component 192 via local area network connections. The network hardware component 192, which can include a router, gateway, switch, bridge, modem, system controller, appliance, etc., can provide a local area network connection for the communication system. Each of the APs 106 can have an associated antenna or an antenna array to communicate with the wireless communication devices in its area. The wireless communication devices 102 can register with a particular AP 106 to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to AP 106.

In some embodiments an AP 106 includes a device or module (including a combination of hardware and software) that allows wireless communication devices 102 to connect to a wired network using wireless-fidelity (WiFi), or other standards. An AP 106 can sometimes be referred to as a wireless access point (WAP). An AP 106 can be implemented (e.g., configured, designed and/or built) for operating in a wireless local area network (WLAN). An AP 106 can connect to a router (e.g., via a wired network) as a standalone device in some embodiments. In other embodiments, an AP 106 can be a component of a router. An AP 106 can provide multiple devices access to a network. An AP 106 can, for example, connect to a wired Ethernet connection and provide wireless connections using radio frequency links for other devices 102 to utilize that wired connection. An AP 106 can be implemented to support a standard for sending and receiving data using one or more radio frequencies. For example, the AP 106 may support bandwidth between 5 Gbps to 500 Gbps. Those standards, and the frequencies they use can be defined by the IEEE (e.g., IEEE 802.11 standards like 802.11aa 60 GHz). An AP 106 can be configured and/or used to support public Internet hotspots, and/or on a network to extend the network's Wi-Fi signal range.

In some embodiments, the APs 106 can be used for (e.g., in-home or in-building) wireless networks (e.g., IEEE 802.11aa, any other type of radio frequency based network protocol and/or variations thereof). Each of the wireless communication devices 102 can include a built-in radio and/or are coupled to a radio. Such wireless communication devices 102 and/or APs 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more APs 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
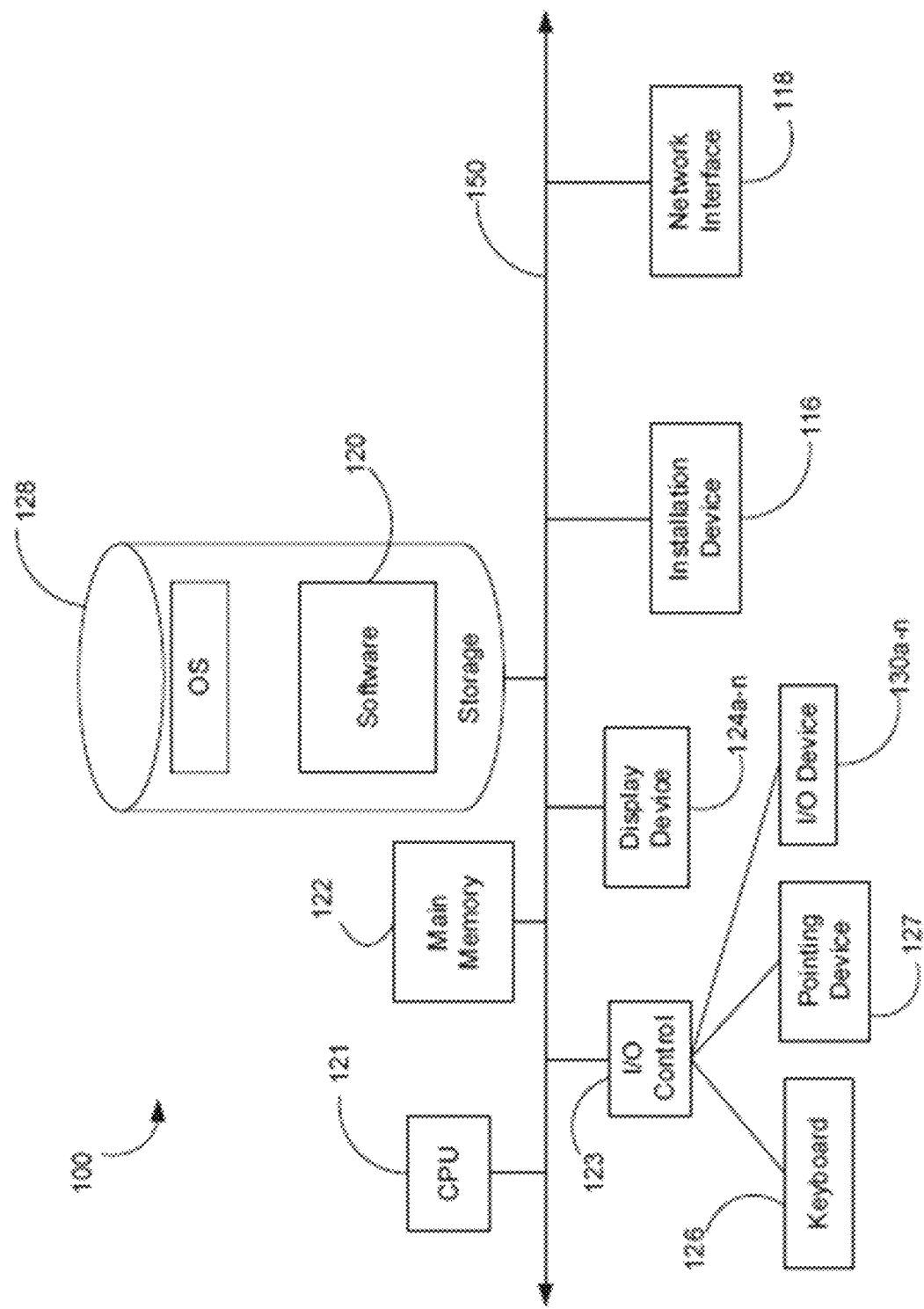
FIGS. 1B and 1C are block diagrams depicting computing devices useful in connection with the methods and systems described herein, in accordance with one or more embodiments of the solution.
Figure 1C:
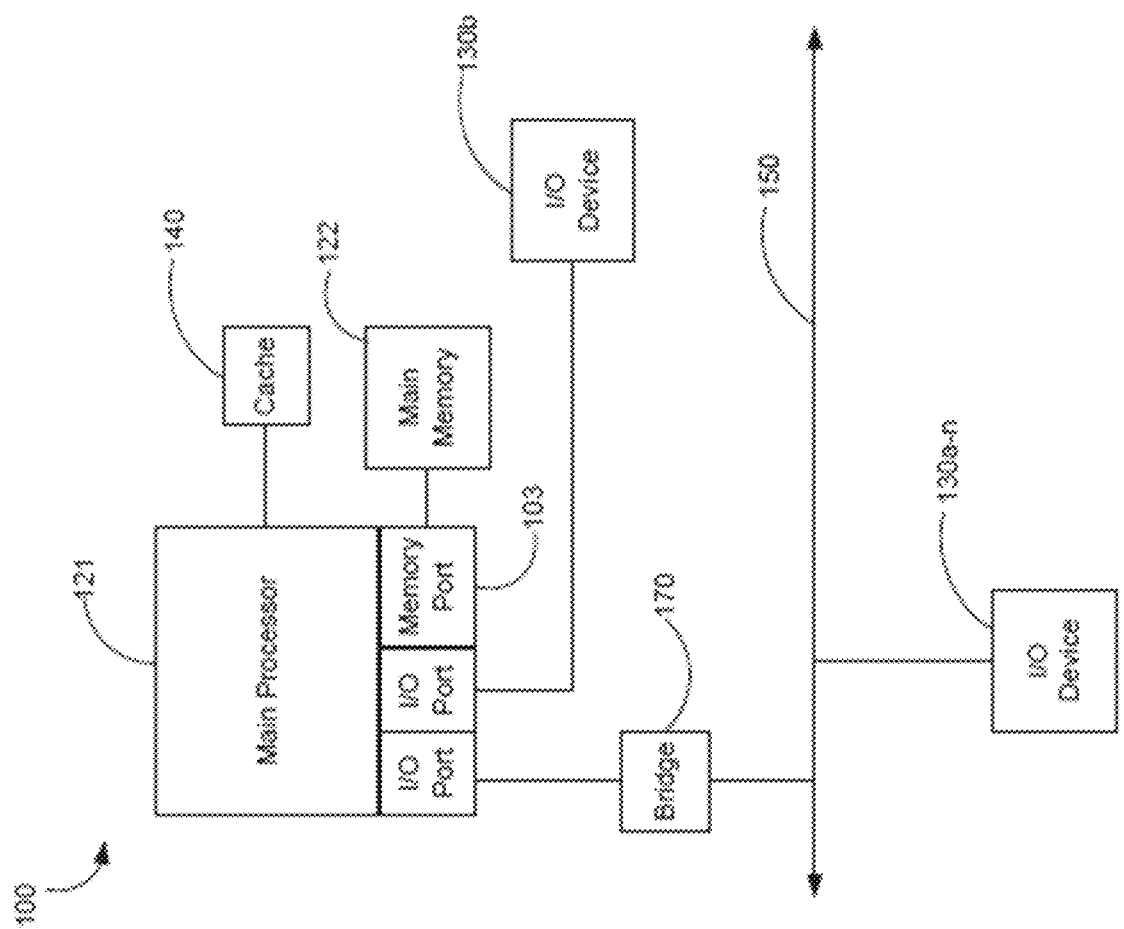

The communications device(s) 102 and access point(s) 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or AP 106. As shown in FIGS. 1B and 1C, each computing device 100 includes a central processing unit 121, and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor (e.g., integrated digital signal processor (DSP)) capable of operating as described herein. For example, in many implementations, a processor may be an application-specific integrated circuit (ASIC), field programmable gate array (FPGA), or any other type and form of dedicated silicon logic or processing circuitry.

Main memory unit 122 can be one or more memory chips capable of storing data and allowing any storage location to be directly accessed by the microprocessor or central processing unit 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above described memory chips, or any other available memory chips capable of operating as described herein. In the embodiment shown in FIG. 1B, the processor or central processing unit 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor or central processing unit 121 communicates directly with cache memory 140 via a secondary bus, sometimes referred to as a backside bus. In other embodiments, the main processor or central processing unit 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor or central processing unit 121 communicates with various I/O devices 130 via a local system bus 150. Various buses can be used to connect the central processing unit 121 to any of the I/O devices 130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor or central processing unit 121 can use an Advanced Graphics Port (AGP) to communicate with the display 124. FIG. 1C depicts an embodiment of a computer device 100 in which the main processor or central processing unit 121 can communicate directly with I/O device 130b, for example via HYPERTRANSPORT, RAPIDIO, or INFINIBAND communications technology. FIG. 1C also depicts an embodiment in which local busses and direct communication are mixed: the processor or central processing unit 121 communicates with I/O device 130a using a local interconnect bus while communicating with I/O device 130b directly.

A wide variety of I/O devices 130a-130n can be present in the computing device 100. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium or installation device 116 for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to the network 104 through a variety of connections including, but not limited to, standard telephone lines, LAN or WAN links (e.g., 802.11, 56 kb, X.25, SNA, DECNET), broadband connections (e.g., Gigabit Ethernet, Ethernet-over-SONET), wireless connections, or some combination of any or all of the above. Connections can be established using a variety of communication protocols (e.g., TCP/IP, Ethernet, SONET, SDH, RS232, IEEE 802.11, IEEE 802.11a, IEEE 802.11b, IEEE 802.11g, IEEE 802.11n, IEEE 802.11ac, IEEE 802.11ad, IEEE 802.11ax, CDMA, GSM, WiMax and direct asynchronous connections). In one embodiment, the computing device 100 communicates with other computing devices 100 via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple displays 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 100 of the sort depicted in FIGS. 1B and 1C can operate under the control of an operating system, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Systems and Methods for Inter-Device Networking Using Intra-Device Protocols

Protocols generally used between device components, such as the PCIe standard (e.g., PCIe 5.0) support high speed transfer rates. Although not strictly limited to communication within a device, and frequently used for communication between devices in a local data center, such high-speed and typically short range protocols are referred to herein generally as intra-device protocols. For example, PCIe 5.0 allows up to 32 GT/s transfer rates for a single lane for connecting a device component to one or more peripheral device components. Lanes may be combined (e.g., up to 16 lanes) for 512 GT/s. PCIe transfers are limited however, if the number of devices becomes too large and/or if applications have significant shared memory resources. For example, in data centers, multiple devices share vast memory pools that stretch PCIe to its functional limits.

Another intra-device protocol, the CXL standard (e.g., CXL 2.0), facilitates communication between multiple peer processors (and other devices and processors) and shared memory using the PCIe physical layer. Data may be copied from a host processor memory to another device's memory. However, when a device updates a memory location (e.g., writing to the memory location), all copies of the memory in memory locations and/or caches are marked invalid, and processors must refetch data from the host memory. CXL is able to achieve low latency communication using transaction protocols, a new handshake, and auto-negotiation to replace and improve upon PCIe protocols.

Figure 2:
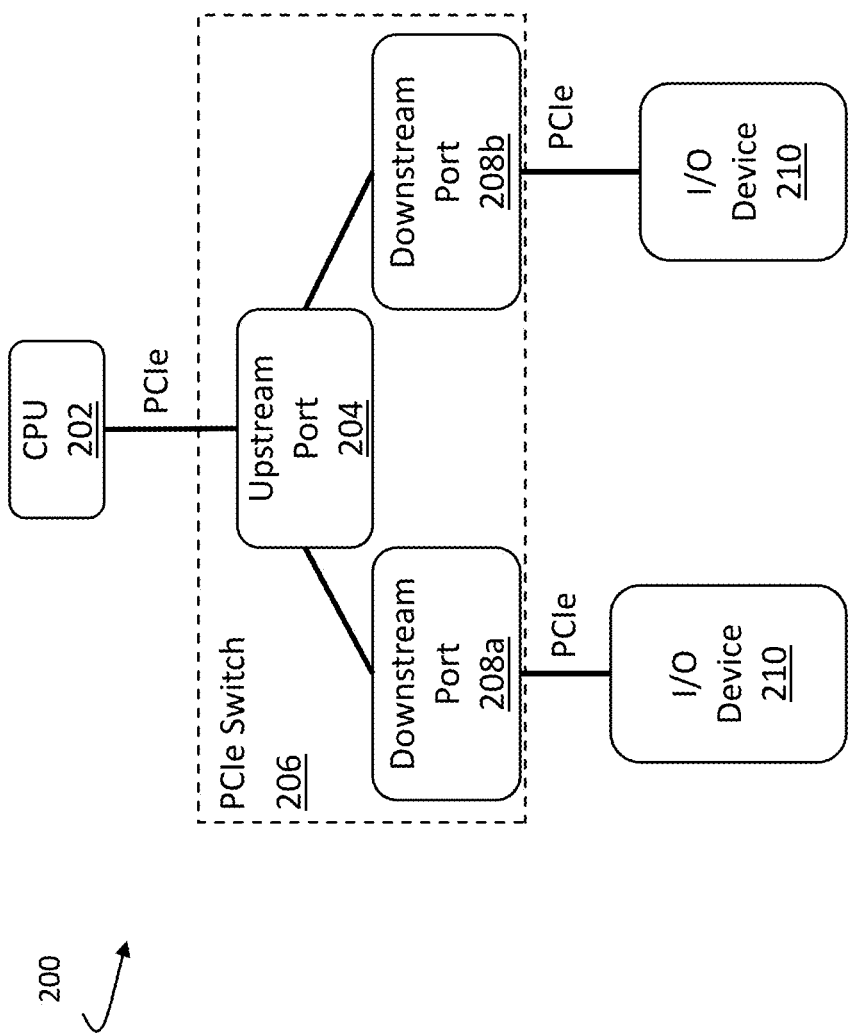
FIG. 2 is a block diagram depicting an example system connecting devices using a PCIe switch to connect devices, in accordance with one or more embodiments of the solution.

Referring to FIG. 2, depicted is a block diagram of an example system 200 connecting devices using a PCIe switch to connect devices. As shown, a CPU 202 connects to I/O devices 210a and 210b (collectively referred to as I/O devices 210) using a PCIe switch 206. The PCIe switch 206 contains an upstream port 204 connecting to CPU 202 and downstream ports 208a and 208b connecting to I/O devices 210a and 210b respectively. The PCIe switch 206 connects CPU 202 to devices 210 within a single network.

While intra-device protocols such as CXL and PCIe improve facilitating communication within a single network, CXL and PCIe are limited to a single network and lack features of inter-device protocols for traversing wide area networks such as the Internet. Previous attempts of CXL and/or PCIe network deployment are limited to the Ethernet layer 2 (e.g., within a single rack or limited to a single switch). Communication across racks requires layer 3 forwarding.

To address these and other problems, intra-device protocols CXL and PCIe may be employed over inter-device protocols such as IP to allow for CXL or PCIe devices to go across an Ethernet layer 2 boundary and connect devices together. For example, layer 3 forwarding allows CXL and/or PCIe communication across a network while utilizing existing network infrastructure to enable larger distributed computing systems. For example, PCIe and CXL networks may be extended across a data center network and connect devices such as accelerators together across an existing IP network (e.g., IPv4 or IPv6).

Figure 3:
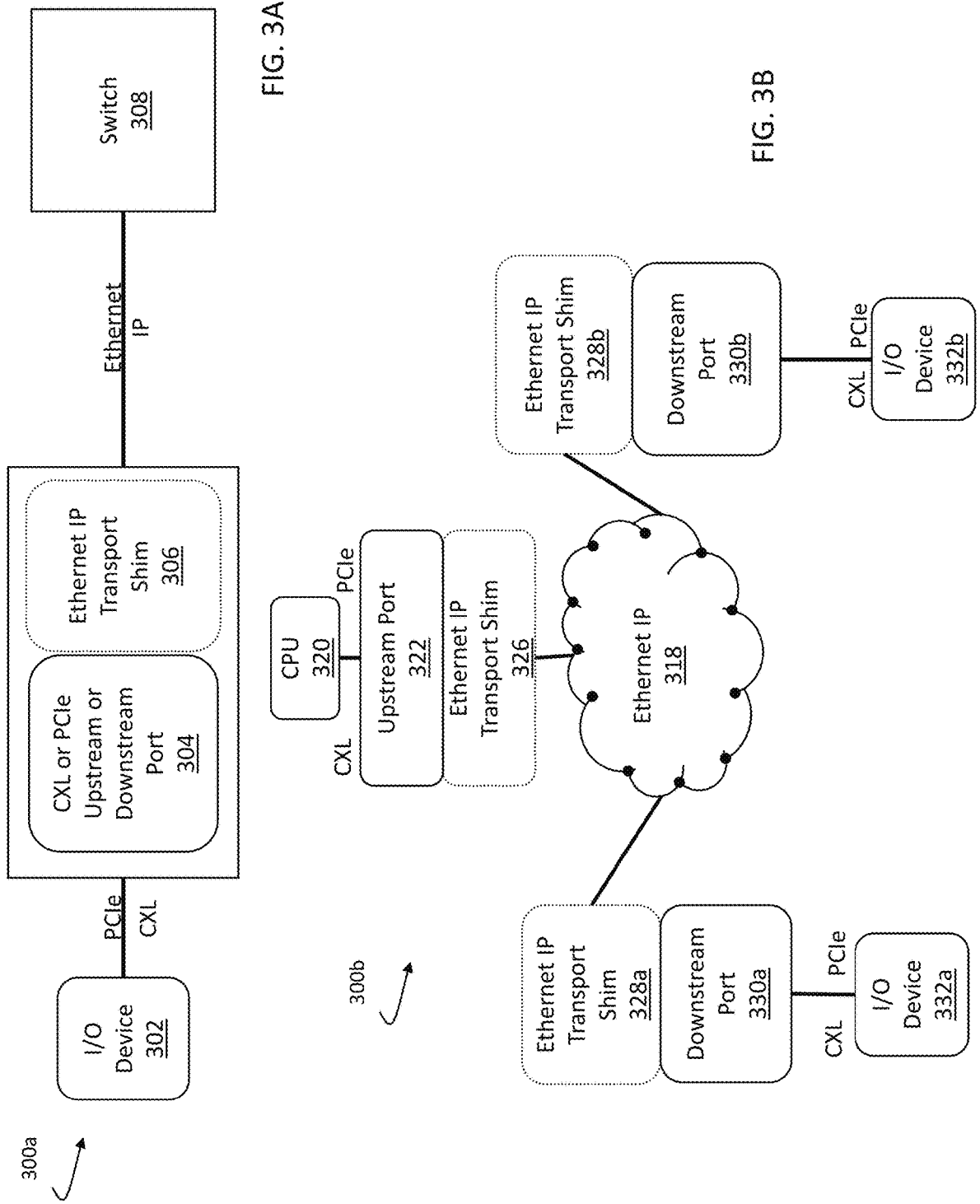
FIGS. 3A and 3B are block diagrams depicting example systems connecting devices across IP networks, in accordance with one or more embodiments of the solution.

Referring to FIG. 3A, depicted is a block diagram of an example system 300a connecting devices across an IP network. As shown, I/O device 302 connects to a switch 308 in the same (or different network) using Ethernet and/or IP. Port 304 (an upstream port or a downstream port) interfaces with I/O device 302 using PCIe and/or CXL. If the traffic is traveling to switch 308 from I/O device 302, a shim header may be placed (e.g., at Ethernet IP transport shim layer 306) between the Ethernet and IP headers before the traffic from the I/O device 302 is transmitted to the switch 308.

Referring to FIG. 3B, depicted is another block diagram of an example system 300b connecting devices across an IP network. As shown, CPU 320 interfaces with upstream port 322 using PCIe and/or CXL. An Ethernet IP Transport Shim layer 326 (or Multiprotocol Label Switching (MLPS) header) may apply a shim header to improve data packet delivery by separating service levels, improving traffic flows through virtual private networks (VPNs) and/or traffic engineering (TE). The MLPS protocol forwards packets on the switching layer (layer 2) instead of operating at the routing layer (layer 3). The TSHIM header is applied before the traffic is transmitted to (or received from) the same network or a different network over Ethernet IP 318. Ethernet IP 318 may be any IP network (e.g., IPv4 or IPv6). The traffic may be directed to I/O devices 332a and/or 332b (collectively referred to as I/O devices 332) and received by I/O devices 332 via downstream ports 330a and/or 330b (collectively referred to as downstream ports 330) using PCIe and/or CXL. If the I/O devices 332 transmit traffic directed to CPU 320, a shim header may be placed (e.g., at Ethernet IP transport shim layers 328a and 328b respectively) between the Ethernet and IP headers before the traffic from the I/O device 302 is transmitted to the CPU 320.

Figure 4:
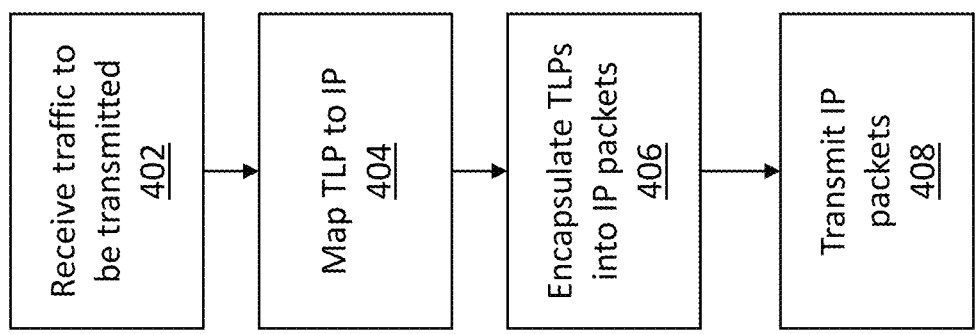
FIG. 4 is a flowchart of a method of transmitting an intra-device protocol via an inter-device network protocol, in accordance with one or more embodiments of the solution.

Referring to FIG. 4, depicted is a flowchart of an embodiment of a method 400 of transmitting intra-device protocols, such as PCIe and/or CXL, over inter-device protocols, such as IP. The functionalities of the method may be implemented using, or performed by, the components detailed herein in connection with FIGS. 1A-1C. In brief overview, traffic to be transmitted may be received in step 402. A computing device may map packets to be transmitted (e.g., transaction layer packets (TLPs)) to a destination IP address in step 404. In step 406, the TLPs may be encapsulated into IP packets, and in step 408 the IP packets may be transmitted to a destination IP address via an Ethernet Media Access Control (MAC).

In step 402, traffic to be transmitted may be received. For example, a CXL and/or PCIe core may receive traffic such as a request to read memory and/or write to memory (or a response to a request). The traffic may be transaction layer packets (TLPs) including a header and an optional data payload. The TLP packet header may include the transaction type (e.g., a request or a response to a request), a priority, a source and/or destination address, routing rules, among other packet characteristics. The destination IP address may be any IP address (e.g., IPv4 or IPv6).

Figure 9:
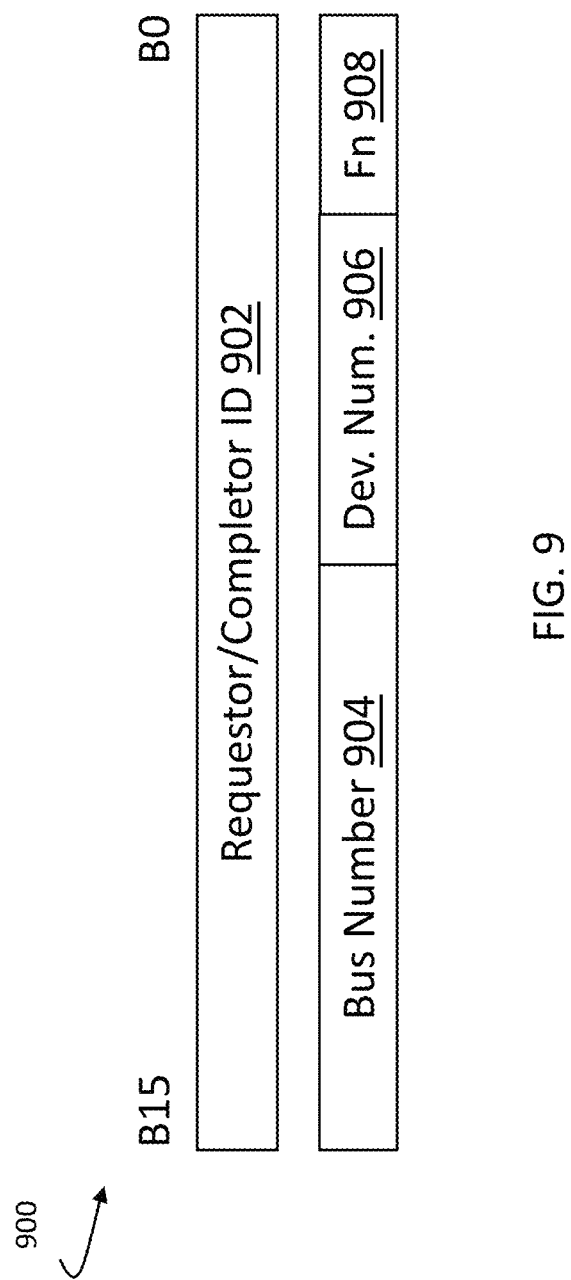
FIG. 9 is a block diagram depicting an example TLP fields, in accordance with one or more embodiments of the solution.

Referring briefly ahead to FIG. 9, depicted is a block diagram of example TLP fields. PCIe and CXL TLPs may be forwarded based on Requestor ID fields 902 (or Memory Address fields). There may be a Type field indicating the type of field present in the packet (e.g., Requestor ID field or Memory Address field) because switching PCIe/CXL may be based on ID routing (in which case the Requestor ID field is present) or Memory Address routing (in which case the Memory Address field is present). The Requestor ID field 902 may be 16 bits long (e.g., bits 15:0). The Bus Number 904 may be 8 bits long (e.g., bits 7:0) and identify a number assigned to a PCIe logical bus. The Device Number (Dev. Num. 906) may be 5 bits long (e.g., bits 7:3) and identify each device on a PCIe logical bus. The Function Number (Fn 908) may be three bits long (e.g., bits 2:0) and identify a function on a device (where each PCIe device may have up to 8 logically independent functions).

Referring back to FIG. 4, in step 404, the traffic may be mapped to a destination IP address. A lookup table may be used to map PCIe addresses (or CXL addresses) and IP addresses. For example, the lookup table may identify (and map) Memory Addresses and/or Requestor IDs to IP sources and destinations. The lookup table may also include UDP and/or TCP source and destination ports numbers.

The lookup table may be statically configured. For example, a text file may be used to configure the lookup table. The lookup table may be copied to various devices upon devices being connected to a network. For example, the table may be distributed to the nodes in a network using, for example, Secure Copy Protocol (SCP), Network Configuration Protocol (NetConf), Yet Another Next Generation (YANG) protocols, or Representational State Transfer Application Program Interface (Rest API). The CXL/PCIe to IP function may be implemented in a standalone device, or may be integrated into an Ethernet/IP switch device.

In step 406, the TLPs may be encapsulated into IP packets. Encapsulating CXL and/or PCIe packets into IP packets allows resources across the network to be combined into systems. Encapsulating the TLPs may include wrapping the layer 2 information into a payload and adding a layer 3 header.

In step 408, the encapsulated IP packets may be transmitted. For example, an Ethernet MAC implementing a data-link layer may be implemented to transmit the IP packets to a destination IP address. The packets may be transmitted wirelessly or connectedly across one or more networks using various routing protocols to reach the destination IP address.

Reliable transport protocols such as Transmission Control Protocol (TCP) may be utilized to transmit the IP packets to the destination IP address. The transport protocol may be selected based on various networking requirements. For example, while TCP may be a commonly used reliable transport protocol, TCP may not be optimal for latency-sensitive processing because of the timing associated with the retransmission of lost TCP packets. However, the latency associated with TCP may be improved, for example, using a hardware implementation of TCP.

Additionally, unreliable transport protocols such as User Datagram Protocol (UDP), Remote Direct Memory Access (RDMA) over Converged Ethernet (RoCE), Scalable Reliable Datagram (SRD), and/or New Datacenter Protocol (NDP) may be utilized to transmit IP packets to the destination IP address. The transport protocol may be selected based on networking requirements. For example, RoCE protocols may be employed for high-throughput low-latency communications. However, RoCE may not be optimal in large scale networks because priority flow control creates head-of-the-line blocking, congestion spreading, and deadlocks. Further, SRD may load balance and recover quickly from link failures and packet drops. However, SRD may deliver packets out of order, leaving packet restoration to higher layers. Similarly, NDP may provide for low latency for short data transfers at the expense of reordering packets.

UDP based protocols may be made reliable by layering on top of them mechanisms to support ordering and retransmission of lost packets. For example, the Quick UDP Internet Connections (QUIC) protocol, a low latency transport protocol over UDP, may be used to transport PCIe and CXL traffic.

Alternatively, various retransmission controls may be employed to guarantee (or improve the likelihood of) the transmitted IP packets. In a simple example, an alternating bit protocol (ABP) may be utilized to alternate numbering packets '0' and '1' such that a receiver may acknowledge a numbered packet by transmitting an acknowledgement back to the sender with the same numbered packet. If the wrong numbered packet is acknowledged, or the acknowledgement is not received within a predetermined time window, the packet may be retransmitted.

Figure 5:
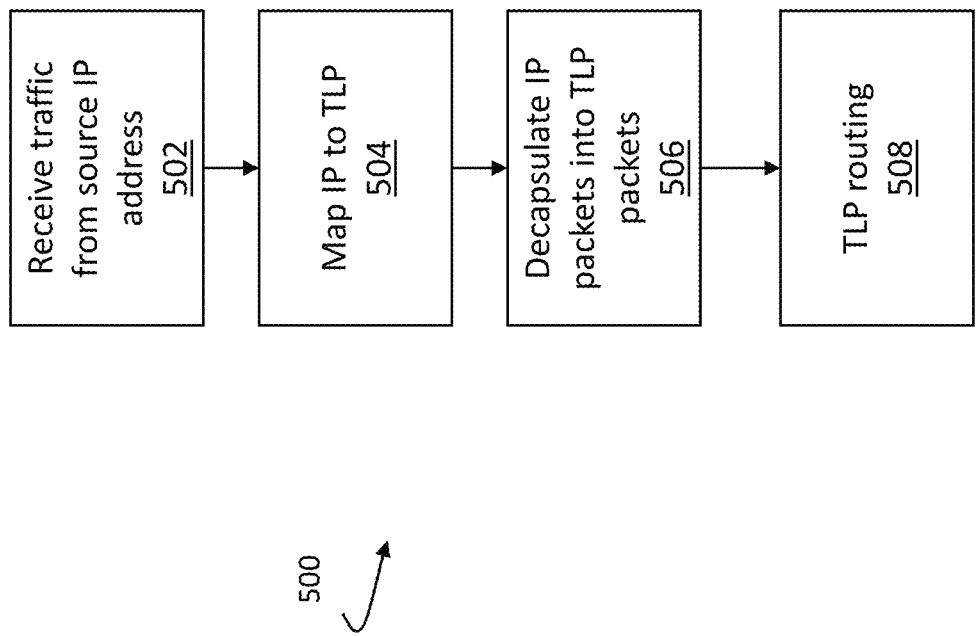
FIG. 5 is a flowchart of a method of receiving an intra-device protocol via an inter-device network protocol, in accordance with one or more embodiments of the solution.

Referring to FIG. 5, depicted is a flowchart of an embodiment of a method 500 of receiving intra-device protocols, such as PCIe and/or CXL over inter-device protocols, such as IP. The functionalities of the method may be implemented using, or performed by, the components detailed herein in connection with FIGS. 1A-1C. In brief overview, traffic is received from a source IP address in step 502. A computing device may map the source IP address to TLPs in step 504. In step 506, the IP packets may be decapsulated into TLPs, and in step 508 the TLPs may be routed.

In step, traffic 502, traffic may be received. For example, IP packets may be routed from across various networks (or the same network) to a computing device. Traffic may include requests to read memory and/or to write memory (e.g., a response to a request).

TLPs that are not order sensitive may be sent out of order, while TLPs that are order sensitive may be buffered and sent in order. In some implementations, packet reordering may be performed. For example, out of order packets may be placed in a buffer, dropped, or forwarded for layer 3 processing, depending on the transport protocol used to transport the packets. For example, TCP corrects out of order packets by requesting retransmission of packets.

In step 504, the traffic may be mapped to TLPs. The traffic may be IP packets (e.g., standard IPv4 or IPv6 packets). For example, a lookup table may be used to map IP addresses to PCIe (or CXL) addresses. For example, the lookup table may identify (and map) Memory Addresses and/or Requestor IDs to IP sources and destinations. The lookup table may also include UDP and/or TCP source and destination ports numbers.

The lookup table may be statically configured. For example, a text file may be used to configure the lookup table. The lookup table may be copied to various devices upon devices being connected to a network. For example, the table may be distributed to the nodes in a network using, for example, Secure Copy Protocol (SCP), Network Configuration Protocol (NetConf), Yet Another Next Generation (YANG) protocols, or Representational State Transfer Application Program Interface (Rest API). The CXL/PCIe to IP function may be implemented in a standalone device, or may be integrated into an Ethernet/IP switch device.

In step 506, the IP packets may be decapsulated into TLP packets. Decapsulation may be the process of unwrapping (or opening) data as the data moves up the protocol stack. For example, unwrapping layer 3 networking information may reveal layer 2 forwarding information (e.g., TLP packets).

In step 508, the TLP packets may be routed. TLP packets (including PCIe and CXL TLPs) are forwarded using, for example, a CXL and/or PCIe core. The TLP packets are routed to the PCIe address and/or CXL address such that memory resources may be shared and/or updated.

Figure 6:
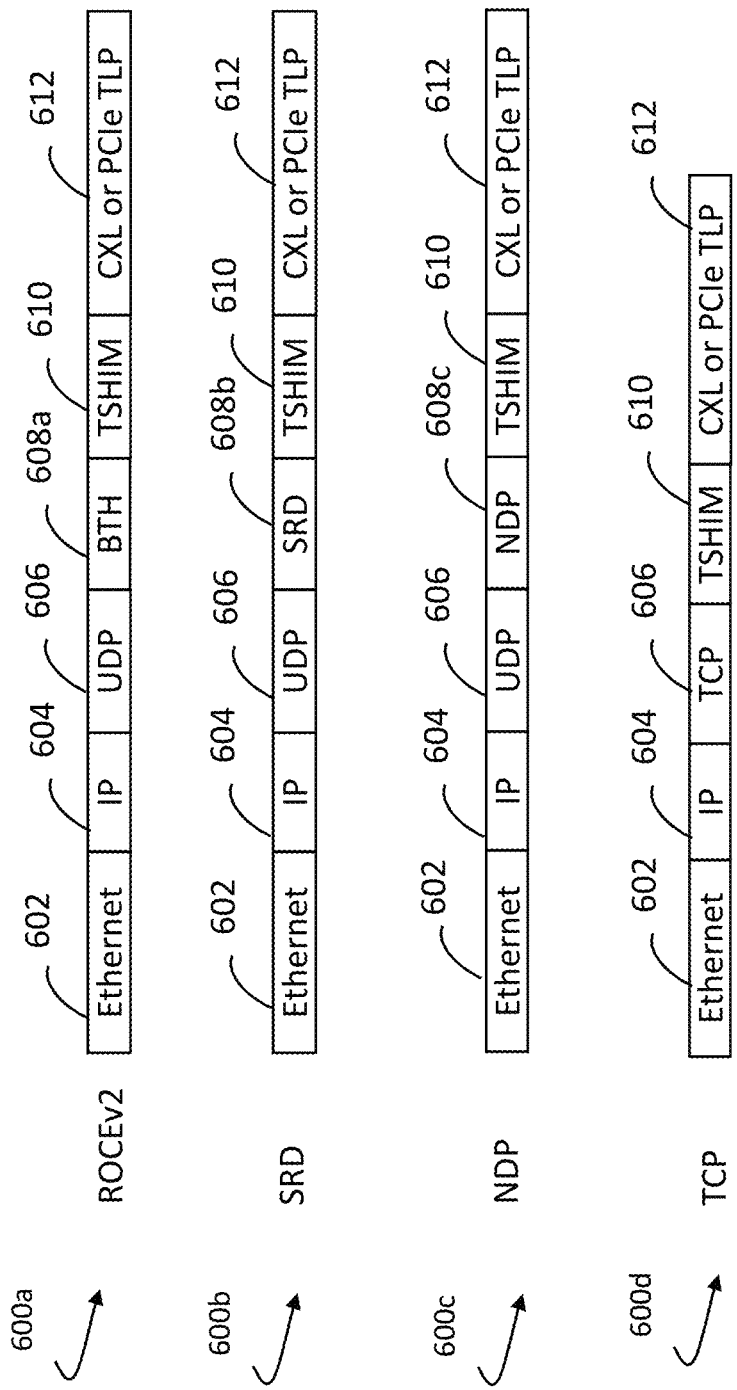
FIG. 6 is block diagram depicting example packet formats given various transport protocols, in accordance with one or more embodiments of the solution.

Referring to FIG. 6, depicted are example packet formats 600a-600d given example transport protocols. Similar to standard packet formats, packet formats 600a-600d may include layer 2 information 602. For example, the Ethernet frame may include sender/receiver MAC addresses. Packet formats 600a-600d may also include layer 3 information 604 (e.g., sender/receiver IP address).

Packet formats 600a-600d may also include layer 4 information 606. Layer 4 information 606 may differentiate between the packet formats depending on the transport protocol. For example, as shown, packet format 600d uses TCP (as identified by the TCP header 606) as the transport protocol while packet formats 600a-600c use UDP based protocols.

As discussed herein, unreliable protocols such as UDP may be used, but reliability mechanisms may be added to support PCIe and/or CXL. Accordingly, particular transport protocols 608 may be identified in the packet format. For example, if using the RoCE protocol as identified by packet format 600a, a base transport header (BTH) 608a may be identified in the packet format. If using the SRD protocol as identified by packet format 600b, the SRD protocol 608b may be identified in the packet format. If using the NDP protocol as identified by packet format 600c, the NDP protocol 608c may be identified in the packet format.

The packet formats 600a-600d may also include a Shim header 610 that contains sequence numbers and PCIe and/or CXL address information to correctly order the frame to the egress. The message may be contained in the CXL and/or PCIe TLP packet 612.

Figure 7:
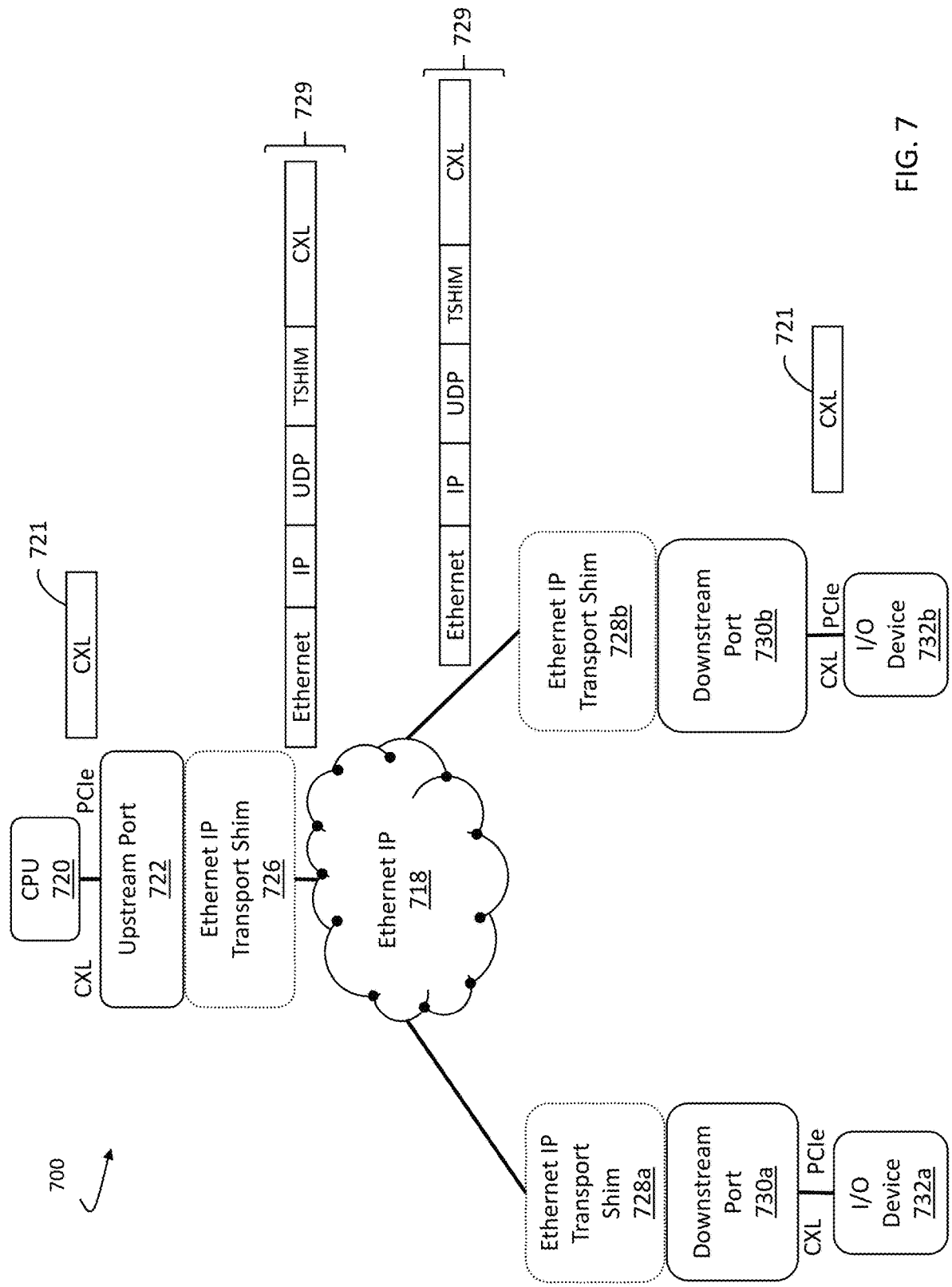
FIG. 7 is a block diagram depicting an example system connecting devices across an IP network using an intra-device protocol, in accordance with one or more embodiments of the solution.

Referring to FIG. 7, depicted is a block diagram of an example 700 system connecting devices across an IP network using CXL. As shown, CPU 720 interfaces with upstream port 722 using CXL and PCIe. The message 721 transmitted (or received) contains CXL data. An Ethernet IP Transport Shim layer 726 may apply a shim header before the traffic is transmitted within the same network or to a different network over Ethernet IP 718. When the traffic is transmitted through Ethernet IP 718, the message may be encapsulated in packet format 729. Ethernet IP 718 may be any version IP network (e.g., IPv4 or IPv6). The traffic may be directed to I/O devices 732a and/or 732b (collectively referred to as I/O devices 732). When the traffic is received by I/O devices 732, the traffic has the packet format 729. The traffic is received by I/O devices 732 via downstream ports 730a and/or 730b (collectively referred to as downstream ports 730) using CXL and PCIe. Decapsulation occurs such that the traffic 729 is unwrapped and the CXL message 721 is received by the destination I/O device 732 (e.g., I/O device 732a and 732b respectively).

Figure 8:
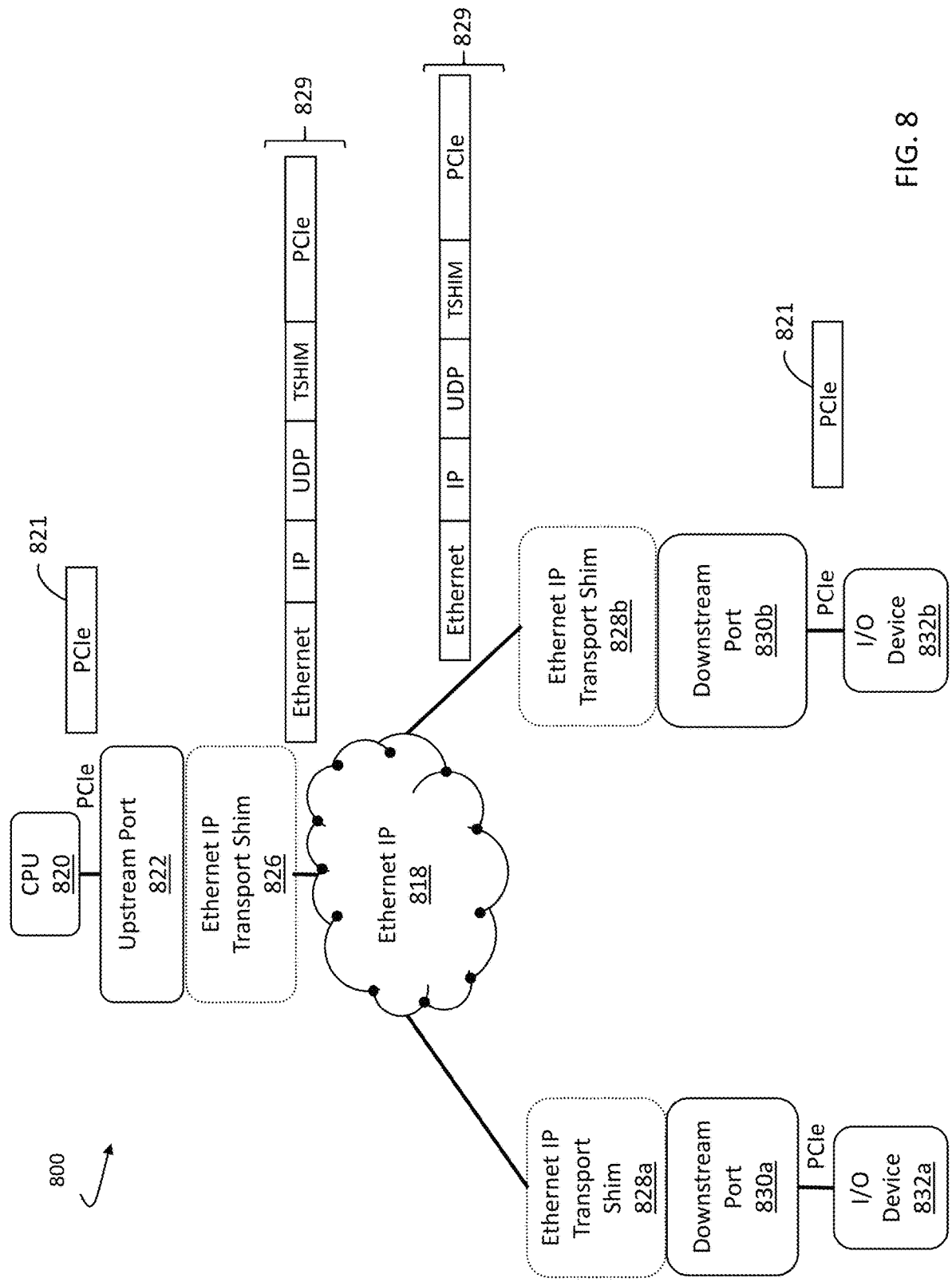
FIG. 8 is a block diagram depicting an example system connecting devices across an IP network using another intra-device protocol, in accordance with one or more embodiments of the solution.

Referring to FIG. 8, depicted is a block diagram of an example 800 system connecting devices across an IP network using PCIe. As shown, CPU 820 interfaces with upstream port 822 using PCIe. The message 821 transmitted (or received) contains PCIe data. An Ethernet IP Transport shim layer 826 may apply a shim header before the traffic is transmitted within the same network or to a different network over Ethernet IP 818. When the traffic is transmitted through Ethernet IP 818, the message may be encapsulated in packet format 829. Ethernet IP 818 may be any version IP network (e.g., IPv4 or IPv6). The traffic may be directed to I/O devices 832a and/or 832b (collectively referred to as I/O devices 832). When the traffic is received by I/O devices 832, the traffic has the packet format 829. The traffic is received by I/O devices 832 via downstream ports 830a and/or 830b (collectively referred to as downstream ports 830) using PCIe. Decapsulation occurs such that the traffic 829 is unwrapped and the PCIe message 821 is received by the destination I/O device 832 (e.g., I/O device 832a and 832b respectively).

Although primarily discussed in terms of PCIe and CXL, as discussed above, any intra-device protocol may be utilized using the systems and methods discussed herein. Similarly, although primarily discussed in terms of network protocols such as IP and TCP, any inter-device protocols or combination of inter-device protocols may be utilized with these systems and methods.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a stand-alone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. A method of transmission over an Internet Protocol (IP) network comprising:
    receiving, by a processor, traffic to be transmitted;
    mapping, by the processor, a Computer Express Link (CXL) address to a destination IP address using a link between the CXL address and the destination IP address in a CXL address to IP address lookup table, the CXL address comprising a requestor identification and the CXL address to IP address lookup table comprising one or more links between requestor identifications of CXL addresses and IP addresses;
    encapsulating, by the processor, the traffic to be transmitted into an IP packet addressed to the destination IP address; and
    transmitting, by the processor, the traffic using the IP packet addressed to the destination IP address.

2. The method of claim 1, wherein transmitting the traffic using the IP packet addressed to the destination IP address comprises using at least one transport protocol of a group consisting of Scalable Reliable Datagram (SRD), New Datacenter Protocol (NDP), Remote Direct Memory Access (RDMA) over Converged Ethernet (RoCE), Transmission Control Protocol (TCP), and User Datagram Protocol (UDP).

3. The method of claim 1, wherein the CXL address to IP address lookup table is statically configured.

4. The method of claim 1 further comprising executing retransmission control protocols to retransmit the IP packet addressed to the destination IP address.

5. The method of claim 1, wherein the CXL address to IP address lookup table comprises the one or more links between requestor identifications of CXL addresses and IP addresses and second one or more links between memory addresses of CXL addresses and IP addresses.

6. The method of claim 5, comprising:
    determining to compare the CXL address to the one or more links between requestor identifications of CXL addresses and IP addresses instead of the one or more links between memory addresses of CXL addresses and IP addresses based on a requestor identification field type in the traffic.

7. A method of receiving data over an Internet Protocol (IP) network comprising:
receiving, by a processor, transmitted traffic;
mapping, by the processor, a source IP address to a Computer Express Link (CXL) address using a link between the source IP address and the CXL address in a source IP address to CXL address lookup table, the CXL address comprising a requestor identification and the CXL address to IP address lookup table comprising one or more links between requestor identifications of CXL addresses and IP addresses;
decapsulating, by the processor, at least a portion of the received traffic into one or more transport layer packets; and
routing, by the processor, the one or more transport layer packets using the mapped CXL address.

8. The method of claim 7, wherein the source IP address to CXL address lookup table is statically configured.

9. The method of claim 7 further comprising reordering, by the processor, one or more packets of the received traffic.

10. A system for transmitting data over an Internet Protocol (IP) network comprising:
a computing device comprising processing circuitry and a network interface;
wherein the network interface is configured to receive traffic to be transmitted; and
wherein the processing circuitry is configured to:
map a Computer Express Link (CXL) address to a destination IP address using a link between the CXL address and the destination IP address in a CXL address to IP address lookup table, the CXL address comprising a requestor identification and the CXL address to IP address lookup table comprising one or more links between requestor identifications of CXL addresses and IP addresses;
encapsulate the traffic to be transmitted into an IP packet addressed to the destination IP address; and
transmit the traffic to be transmitted using the IP packet addressed to the destination IP address.

11. The system of claim 10, wherein transmitting the traffic using the IP packet addressed to the destination IP address comprises using at least one transport protocol of a group consisting of Scalable Reliable Datagram (SRD), New Datacenter Protocol (NDP) Remote Direct Memory Access (RDMA) over Converged Ethernet (RoCE), Transmission Control Protocol (TCP), and User Datagram Protocol (UDP).

12. The system of claim 10, wherein the CXL to IP address lookup table is statically configured.

13. The system of claim 10, wherein the processing circuitry is further configured to execute retransmission control protocols to retransmit the IP packet addressed to the destination IP address.

* * * * *